United States Patent
Shi

(10) Patent No.: US 10,222,584 B2
(45) Date of Patent: Mar. 5, 2019

(54) CAMERA LENS

(71) Applicant: Rongbao Shi, Shenzhen (CN)

(72) Inventor: Rongbao Shi, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 3 days.

(21) Appl. No.: 15/360,431

(22) Filed: Nov. 23, 2016

(65) Prior Publication Data

US 2018/0017762 A1 Jan. 18, 2018

(30) Foreign Application Priority Data

Jul. 18, 2016 (CN) .......................... 2016 1 0567131

(51) Int. Cl.
*G02B 9/34* (2006.01)
*G02B 13/00* (2006.01)

(52) U.S. Cl.
CPC .............. *G02B 13/004* (2013.01); *G02B 9/34* (2013.01)

(58) Field of Classification Search
CPC ........ G02B 9/34; G02B 13/18; G02B 13/004; G02B 13/04; G02B 13/22; G02B 3/00; G02B 3/02; G02B 3/04; G02B 3/06; G02B 3/08; G02B 9/00; G02B 9/02; G02B 9/04; G02B 9/06; G02B 9/08; G02B 9/10; G02B 9/12; G02B 9/14; G02B 9/16; G02B 9/18; G02B 9/20; G02B 9/22; G02B 9/24; G02B 9/26; G02B 9/28; G02B 9/30; G02B 9/32; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 9/60; G02B 9/62; G02B 9/64; G02B 13/00; G02B 13/002; G02B 13/0045
USPC ........................................................ 359/715
See application file for complete search history.

(56) References Cited

U.S. PATENT DOCUMENTS

| | | | | |
|---|---|---|---|---|
| 5,109,469 A | * | 4/1992 | Duggan | G01T 1/2002 313/372 |
| 6,556,356 B2 | * | 4/2003 | Ohtake | G02B 15/173 359/684 |
| 8,068,290 B1 | * | 11/2011 | Tsai | G02B 13/004 359/715 |
| 2004/0136097 A1 | * | 7/2004 | Park | G02B 9/34 359/773 |
| 2013/0335588 A1 | * | 12/2013 | Matsusaka | G02B 3/00 348/220.1 |

* cited by examiner

*Primary Examiner* — William R Alexander
*Assistant Examiner* — Henry A Duong
(74) *Attorney, Agent, or Firm* — Na Xu; IPro, PLLC

(57) ABSTRACT

A camera lens is disclosed. The camera lens includes, in an order from an object side to an image side, a first lens with a positive refractive power; a second lens with a negative refractive power; a third lens with a positive refractive power; and a fourth lens with a negative refractive power. The camera lens further satisfies specific conditions.

7 Claims, 4 Drawing Sheets

CAMERA LENS

FIELD OF THE INVENTION

The present disclosure relates to a camera lens for a portable electronic device.

DESCRIPTION OF RELATED ART

In recent years, with the flourishing development of the miniaturized camera lens, the demand of micro imaging module is increasing gradually, however, the photosensitive components of the general camera lens includes the charge coupled component or complementary metal oxidized conductor component, with the fine development of the semiconductor manufacturing process, the pixel size of the photosensitive component is further miniaturized, plus, the existing electronic products tend to have the optimum functions, and become thin, short and small, therefore, the miniaturized camera lens with good imaging quality becomes the mainstream in current market.

The existing four-piece camera lens, in an order from object side to image side, is configured with a first lens with the positive refractive power, a second lens with the negative refractive power, a third lens with the positive refractive power, a fourth lens with the negative refractive power, because the refractive power distribution and shape of the first lens, the second lens, the third lens and the fourth lens of the existing four-piece camera lens are not sufficient, so its sensibility is not high to further correct the chromatic aberration, which causes that it has the ordinary optical performance. Meanwhile, most of the existing four-piece camera lenses are assembled together with certain difficulty in shortening the optical length.

Therefore, it is necessary to provide an improved camera lens to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
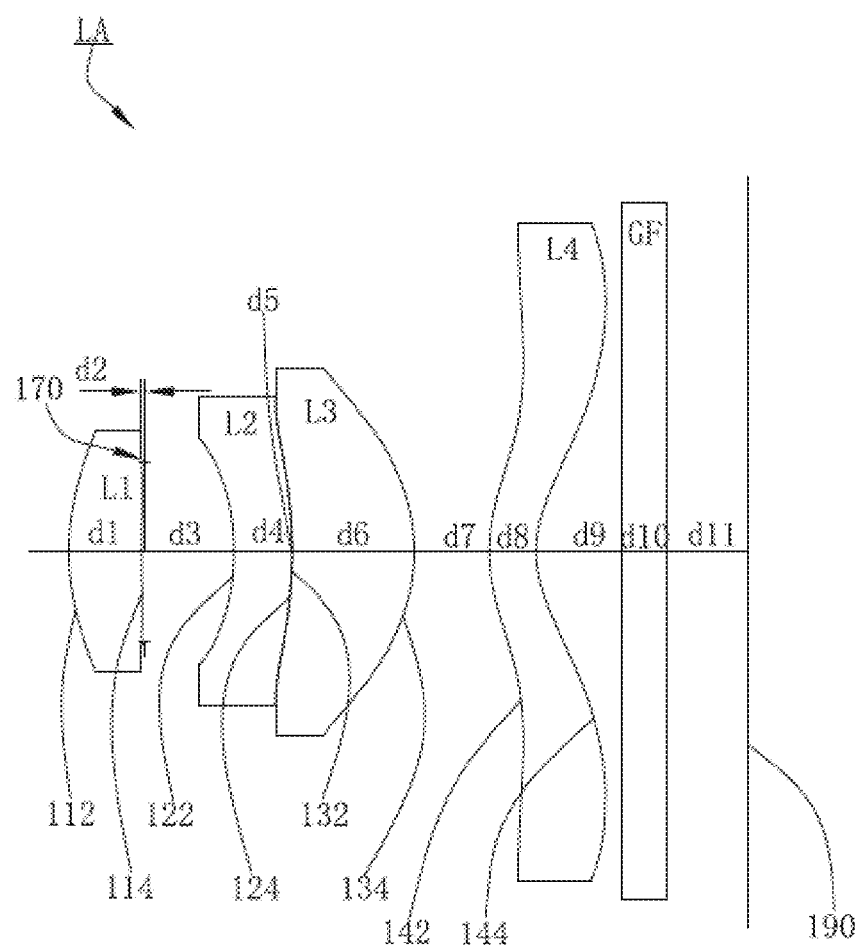
FIG. 1 is an illustration of a camera lens in accordance with an exemplary embodiment of the present disclosure.

Referring to FIG. 1, a camera lens LA in accordance with an exemplary embodiment of the present disclosure includes, in an order from an object side to an image side, a first lens L1, a second lens L2, a third lens L3 and a fourth lens L4, and the second lens L2 and the third lens L3 are glued together. An aperture stop is provided between the first lens L1 and the second lens L2, and a glass flat (GF) is configured between the fourth lens L4 and the image surface 190.

In this embodiment, all the above four lenses are plastic lens, whose specific structures as follows:

The first lens L1 is a positive lens, with a positive refractive power, whose object side surface 112 is convex, and image side surface 114 is convex, and the object side surface 112 and the image side surface 114 are aspheric surfaces, and there is an inflection point set on the object side surface 112 of the first lens L1; there is an inflection point and an arrest point set in the image side surface 114;

The second lens L2 is a negative lens, with a negative refractive power, whose object side surface 122 is concave, and image side surface 124 is convex, and the object side surface 122 and image side surface 124 are aspheric surfaces, and there is an inflection point and an arrest point set on the image side surface 122 of the second lens L2;

The third lens L3 is a positive lens, with a positive refractive power, whose object side surface 132 is convex, and image side surface 134 is concave, and the object side surface 132 and image side surface 134 are aspheric surfaces, and the object side surface 132 of the third lens L3 is set with two inflection points and one arrest point, and the image side surface 134 is set with one inflection point and one arrest point;

The fourth lens L4 is a negative lens whose negative refractive power, and object side surface 142 is convex, and image side surface 144 is concave, and the object side surface 142 and the image side surface 144 is an aspheric surface, and the object side surface 142 of the fourth lens L4 is set with three inflection points and one arrest point, whose image side surface 144 is set with an inflection point and an arrest point;

The aperture stop 170 is located between the first lens L1 and the second lens L2, which is used for controlling the light entrance volume and controlling the depth of focal length. The glass plate GF can use the glass cover piece or filter lens, and the filter lens can filter the light ray, whose types can be chosen according to actual need. It is also fine if the glass plate GF is not set between the fourth lens L4 and the image surface 190.

In the embodiment, the camera lens satisfies the following conditions:

$$0.5 < f1/f < 1.1 \tag{1};$$

$$-2 < f2/f < -0.5 \tag{2};$$

$$0.65 < f3/f < 1.1 \tag{3};$$

$$-2.5 < f4/f < -1.8 \tag{4};$$

where, f: Total focal length of the camera lens;
f1: Focal length of the first lens;
f2: Focal length of the second lens;
f3: Focal length of the third lens;
F4: Focal length of the fourth lens.

The conditions (1)-(4) stipulate focal lengths of the first lens L1, the second lens L2 and the third lens L3 and the fourth lens L4. It is hard to make the camera lens more miniaturized and clearer beyond conditions (1)-(4).

Meanwhile, in order to let the camera lens LA have the advantages including shorter optical length, lower sensitivity, higher sensibility, less pixel chromatic aberration and lower cost, it is better to design parameters of the first lens L1, the second lens L2, the third lens L3 and the fourth lens L4 in the following scope:

[Focal Length]

In the whole structure of the camera lens LA, the focal length of the first lens L1, the second lens L2, the third lens L3 and the fourth lens L4 of the camera lens LA need to meet the following conditions:

$$1.5 \text{ mm} < f1 < 3.0 \text{ mm};$$

$$-5 \text{ mm} < f2 < -1.9 \text{ mm};$$

$$1 \text{ mm} < f3 < 2 \text{ mm}; \text{ and}$$

$$-12 \text{ mm} < f4 < -2 \text{ mm}.$$

[Refractive Power]

In the whole structure of the camera lens LA, the refractive power of the first lens L1, the second lens L2, the third lens L3 and the fourth lens L4 of the camera lens LA need to meet the following conditions:

$$1.50 < n1 < 1.55;$$

$$1.60 < n2 < 1.70;$$

$$1.50 < n3 < 1.55; \text{ and}$$

$$1.50 < n4 < 1.55;$$

where, n1: Refractive power of the first lens;
n2: Refractive power of the second lens;
n3: The refractive power of the third lens;
n4: The refractive power of the fourth lens;

[Abbe Number]

In the whole structure of the camera lens LA, the Abbe number of the first lens L1, the second lens L2, the third lens L3 and the fourth lens L4 of the camera lens LA need to meet the following conditions:

$$40 < v1 < 60;$$

$$15 < v2 < 30;$$

$$40 < v3 < 60;$$

$$40 < v4 < 60;$$

where, v1: Abbe number of the first lens;
v2: Abbe number of the second lens;
v3: Abbe number of the third lens;
v4: Abbe number of the fourth lens.

If the focal length, refractive power and Abbe number of the first lens L1, the second lens L2, the third lens L3 and the fourth lens L4 don't meet above condition, the chromatic aberration characteristics and telocentric characteristics of the camera lens LA may be worsened, and the sensitivity of the camera lens LA will be increased, and it is hard to make the camera lens LA miniaturized, and it is not good for reducing the cost of the camera lens LA.

In this invention, the first lens is a positive lens bearing the main refractive power of the camera lens LA, which is good for reducing the optical length; the second lens L2 uses the material with high refractive power and low Abbe number, capable of correcting the chromatic aberration reasonably; And the second lens L2 and the third lens L3 are glued together, which is good for reducing the optical length and inhibiting the ghost image. Because the four lenses of which the camera lens LA is composed have the composition and meet all the conditions, the camera lens LA manufactured has excellent optical feature, FNo<2.5, with high sensibility, of which, FNo: F value, i.e. ratio between the total focal length of the camera lens as a whole and the incident pupil diameter.

In the following, we will explain the camera lens LA in this invention by a specific embodiment. The symbols recorded in the embodiment are shown as follows. The unit of the distance, radius and central thickness is mm.

f: Total focal length of the camera lens;
f1: Focal length of the first lens;
f2: Focal length of the second lens;
f3: Focal length of the third lens.
F4: Focal length of the fourth lens.
Fno: F value;
2ω: total angle of view;
S1: aperture stop;
R: curvature radius of the optical surface, when it is lens, it is central curvature radius;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the glass plate (GF);
R10: curvature radius of the image side surface of the glass plate (GF);
d: central thickness of lenses or the distance between lenses
d1: central thickness of the first lens L1;
d2: axial distance between the image side surface of the first lens L1 and the aperture stop S1;
d3: the axial distance between the aperture stop S1 to the object side surface of the second lens L2;
d4: the central thickness of the second lens L2;
d5: the axial distance between the image side surface of the second lens L2 and the object side surface of the third lens L3;
d6: the central thickness of the third lens L3;
d7: the axial distance between the image side surface of the third lens L3 and the object side surface of the glass plate GF;
d8: the central thickness of the fourth lens L4;
d9: the axial distance between the image side surface of the fourth lens L4 and the object side surface of the glass plate GF;
d10: the central thickness of the glass plate GF;
d11: the axial distance between the image side surface and the image surface of the glass plate GF;
nd: the refractive power of line d;
nd1: the refractive power of line d of the first lens L1;
nd2: the refractive power of line d of the second lens L2;
nd3: the refractive power of line d of the third lens L3;
nd4: the refractive power of line d of the fourth lens L4;
nd5: the refractive power of line d of the glass plate GF;

v: Abbe number
v1: Abbe number of the first lens L1;
v2: Abbe number of the second lens L2;
v3: Abbe number of the third lens L3;
v4: Abbe number of the fourth lens L4;
v5: Abbe number of the glass plate GF;
TTL: optical length (the axial distance from the object side surface to the imaging surface of the first lens L1);
LB: the axial length from the image side surface of the fourth lens L4 to the imaging surface (including the thickness of the glass plate GF);
IH: image height $$y=(x2/R)/[1+\{1-(k+1)(x2/R2)\}^{1/2}]+A4x4+A6x6+A8x8+A10x10+A12x12+A14x14+A16x16 \quad (4)$$

wherein, R is the curvature radius on the axis, k is the cone coefficient, A4, A6, A8, A10, A12, A14 and A16 are aspheric coefficients.

For convenience, the aspheric surfaces in the condition (5) are used for aspheric surfaces of various lens surfaces. But it is not limited to the aspheric polynomial forms denoted by the condition (5).

The curvature radius R, central thicknesses of the lens or the distances between the lens d, the refractive power nd and Abbe numbers v of the object sides and image sides of the first lens L1~the fourth lens L4 of which the camera lens is composed in the embodiment are shown in table 1. The cone coefficient k and aspheric coefficient are shown in the table 2. The values corresponding to the parameters stipulated by the conditions (1)~(4) and various values in the embodiment are listed in the table 3.

TABLE 1

| | R | d | | nd | | v |
|---|---|---|---|---|---|---|
| R1 | 1.20321 | d1 = | 0.340 | nd1 | 1.5441 | v1 | 56.10 |
| R2 | 14.22956 | d2 = | 0.010 | | | |
| S1 | ∞ | d3 = | 0.422 | | | |
| R3 | −1.15624 | d4 = | 0.272 | nd2 | 1.6398 | v2 | 23.27 |
| R4 | −2.50000 | d5 = | 0.000 | | | |
| R5 | −2.50000 | d6 = | 0.569 | nd3 | 1.5441 | v3 | 56.10 |
| R6 | −0.88285 | d7 = | 0.350 | | | |
| R7 | 0.75319 | d8 = | 0.219 | nd4 | 1.5441 | v4 | 56.10 |
| R8 | 0.53220 | d9 = | 0.402 | | | |
| R9 | ∞ | d10 = | 0.210 | nd5 | 1.5168 | v5 | 56.17 |
| R10 | ∞ | d11 = | 0.393 | | | |

TABLE 2

| | cone coefficient | aspheric coefficient | | | | | | |
|---|---|---|---|---|---|---|---|---|
| | k | A4 | A6 | A8 | A10 | A12 | A14 | A16 |
| R1 | −24.34877 | 1.6459E+00 | −1.0747E+01 | 6.3811E+01 | −2.8651E+02 | 8.3383E+02 | −1.4124E+03 | 1.0293E+03 |
| R2 | 73.2023 | −5.7020E−02 | −4.3241E+00 | 8.0472E+01 | −8.8125E+02 | 5.2281E+03 | −1.6082E+04 | 2.0051E+04 |
| R3 | 1.502403 | −3.0865E−01 | 2.1703E+00 | −2.8776E+01 | 2.0077E+02 | −7.5143E+02 | 1.4302E+03 | −1.0655E+03 |
| R4 | −21.22605 | −7.1265E−01 | 3.1537E+00 | −4.0139E+00 | −9.5999E+00 | 4.8304E+01 | −7.6003E+01 | 4.4479E+01 |
| R5 | −21.22605 | −7.1265E−01 | 3.1537E+00 | −4.0139E+00 | −9.5999E+00 | 4.8304E+01 | −7.6003E+01 | 4.4479E+01 |
| R6 | −0.1907316 | 4.2935E−02 | 1.3224E−01 | 2.1599E−02 | 6.3774E−02 | 1.3933E−01 | 1.9106E−01 | — |
| R7 | −2.963059 | −5.4742E−01 | 1.7895E−01 | 4.6983E−01 | −6.6192E−01 | 3.9005E−01 | −1.1273E−01 | 1.3000E−02 |
| R8 | −2.034427 | −6.9351E−01 | 8.1222E−01 | −6.6272E−01 | 3.8305E−01 | −1.5078E−01 | 3.5568E−02 | −3.7158E−03 |

TABLE 3

| | Embodiment | Condition |
|---|---|---|
| f1/f | 1.06 | (1) |
| f2/f | −0.86 | (2) |
| f3/f | 0.68 | (3) |
| f4/f | −2.27 | (4) |
| f1 | 2.39 | |
| f2 | −1.94 | |
| f3 | 1.54 | |
| f4 | −5.12 | |
| f | 2.25 | |
| EFL/TTL | 0.7 | |
| Fno | 2.4 | |
| 2ω | 74.5 | |
| LB | 1.005 | |
| TTL | 3.187 | |

As shown in table 3, this embodiment meets the conditions (1)~(4).

Figure 2:
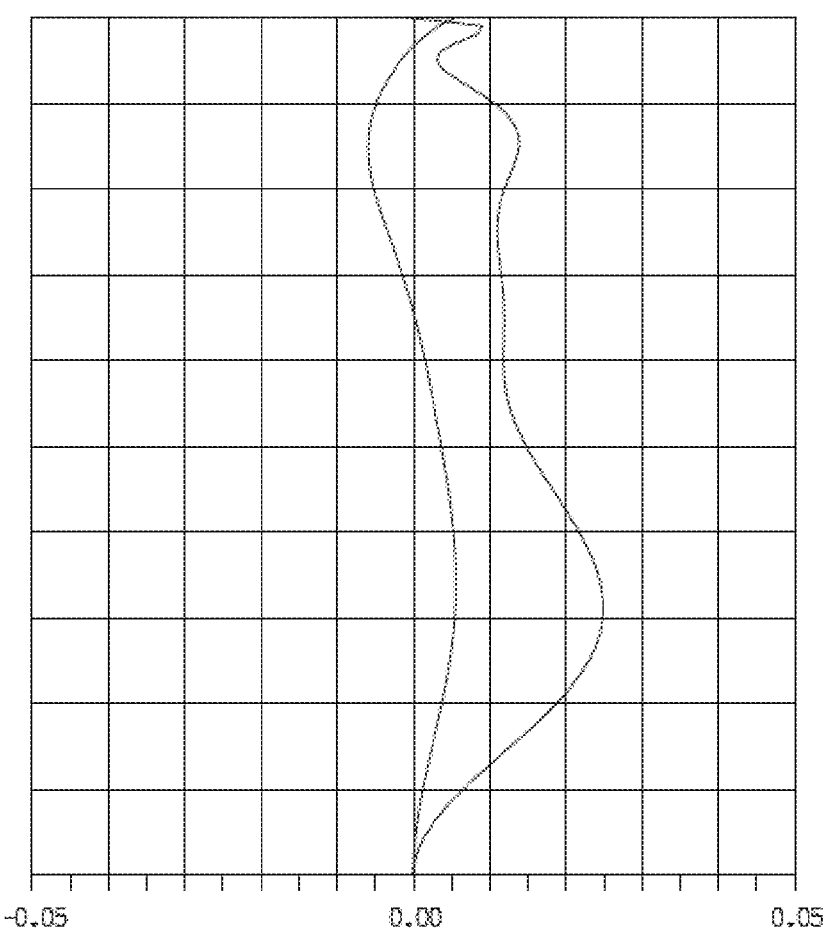
FIG. 2 is a diagram of Field Curvature of the camera lens.
Figure 3:
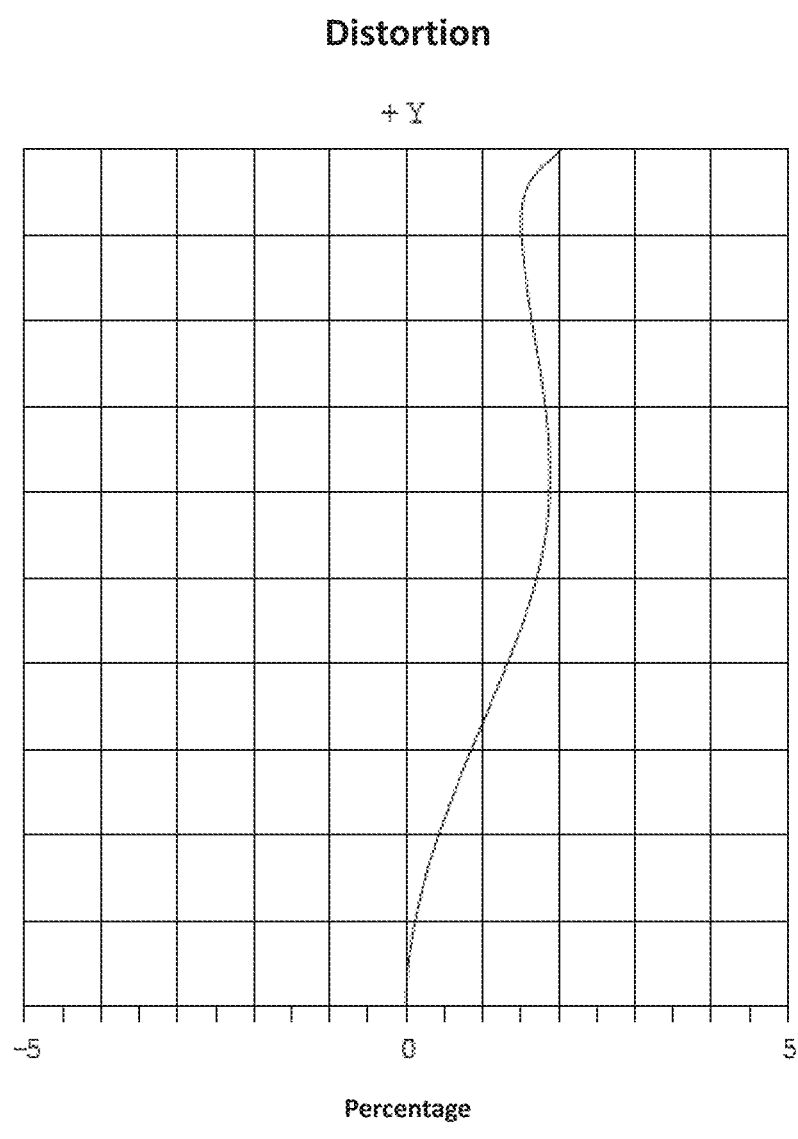
FIG. 3 is a diagram of Distortion of the camera lens.
Figure 4:
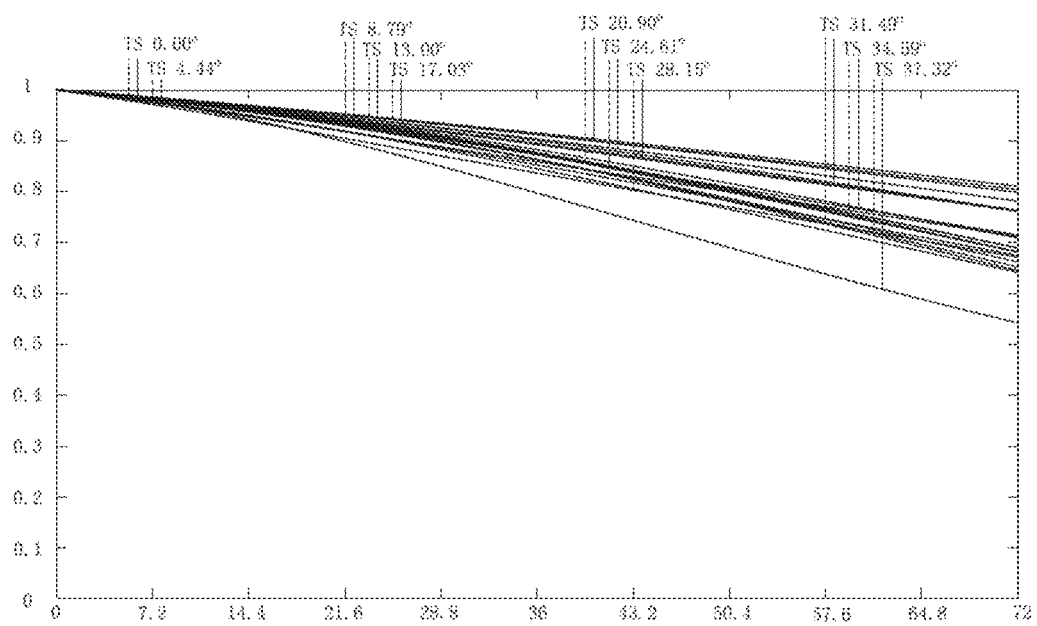
FIG. 4 is an MTF curve of the camera lens.

Referring to FIGS. 2-4, FIG. 2 is a curvature of field of the camera lens, and FIG. 3 is a distortion of the camera lens shown, and FIG. 4 is the MTF curve of the camera lens. As shown in FIGS. 2-3, the camera lens LA provided by this invention has higher optical performance.

The camera lens LA provided by this invention has the following helpful result: by optimizing the surface, distributing the focal power and choosing the optical material, this invention is designed with a camera lens LA having clear image that is suitable for miniaturized electronic equipment, and the first lens is a positive lens bearing the main focal power of the camera lens LA, which is capable of reducing the optical length efficiently; the second lens L2 uses the material with high refractive power and low Abbe number, capable of correcting the chromatic aberration efficiently; And the second lens L2 and the third lens L3 are glued together, which is capable of reducing the optical length efficiently and inhibiting the ghost image in certain degree, making the camera lens LA have the low sensitivity and high-luminous flux while acquiring high imaging performance, with the following excellent optical characteristics: 2ω=74.5°, FNo<2.5 high sensibility.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A camera lens comprising, in an order from an object side to an image side:

a first lens with a positive refractive power;
a second lens with a negative refractive power;
a third lens with a positive refractive power;
a fourth lens with a negative refractive power; wherein the camera lens satisfies the following conditions (1)~(4) and (1a)~(4a):

$$0.5 < f1/f < 1.1 \quad (1);$$

$$-2 < f2/f < -0.5 \quad (2);$$

$$0.65 < f3/f < 1.1 \quad (3);$$

$$-2.5 < f4/f < -2.27 \quad (4);$$

$$1.5 \text{ mm} < f1 < 3.0 \text{ mm} \quad (1a);$$

$$-5 \text{ mm} < f2 < -1.9 \text{ mm} \quad (2a);$$

$$1 \text{ mm} < f3 < 2 \text{ mm} \quad (3a);$$

$$-12 \text{ mm} < f4 < -2 \text{ mm} \quad (4a);$$

where,
f: Total focal length of the camera lens;
f1: Focal length of the first lens;
f2: Focal length of the second lens;
f3: Focal length of the third lens;
f4: Focal length of the fourth lens.

2. The camera lens as described in claim 1 further satisfying the following conditions (1b)~(4b):

$$1.50 < n1 < 1.55 \quad (1b);$$

$$1.60 < n2 < 1.70 \quad (2b);$$

$$1.50 < n3 < 1.55 \quad (3b);$$

$$1.50 < n4 < 1.55 \quad (4b);$$

where,
n1: Refractive power of the first lens;
n2: Refractive power of the second lens;
n3: Refractive power of the third lens;
n4: Refractive power of the fourth lens.

3. The camera lens as described in claim 1 further satisfying the following conditions (1c)~(4c):

$$40 < v1 < 60 \quad (1c);$$

$$15 < v2 < 30 \quad (2c);$$

$$40 < v3 < 60 \quad (3c);$$

$$40 < v4 < 60 \quad (4c);$$

where,
v1: Abbe number of the first lens;
v2: Abbe number of the second lens;
v3: Abbe number of the third lens;
v4: Abbe number of the fourth lens.

4. The camera lens as described in claim 1, wherein the second lens satisfies the following conditions:

$$1.60 < n2 < 1.70;$$

$$15 < v2 < 30;$$

where,
n2: Refractive power of the second lens;
v2: Abbe number of the second lens.

5. The camera lens as described in claim 1, wherein F value FNo of the camera lens meets the following condition:

$$FNo < 2.5;$$

where, FNo is the ratio between the total focal length of the camera lens as a whole and the incident pupil diameter.

6. The camera lens as described in claim 1 further including an aperture stop between the first lens and the second lens.

7. The camera lens as described in claim 1, wherein the object side surface of the third lens is glued to the image side surface of the second lens.

* * * * *